(12) United States Patent
O'Shea

(10) Patent No.: US 6,766,688 B2
(45) Date of Patent: Jul. 27, 2004

(54) TANK VOLATILE LIQUID LEVEL OR VOLUME GAUGE

(75) Inventor: James P. O'Shea, Riverside, RI (US)

(73) Assignee: MIJA Industries, Inc., Rockland, MA (US)

( * ) Notice: Subject to any disclaimer, the term of this patent is extended or adjusted under 35 U.S.C. 154(b) by 0 days.

(21) Appl. No.: 10/024,431

(22) Filed: Dec. 18, 2001

(65) Prior Publication Data

US 2002/0083768 A1 Jul. 4, 2002

Related U.S. Application Data

(60) Provisional application No. 60/256,372, filed on Dec. 18, 2000.

(51) Int. Cl.[7] .......................... G01F 23/56; G01F 23/36; G01F 23/30; G08B 21/00
(52) U.S. Cl. .......................... 73/319; 73/313; 340/624; 116/228
(58) Field of Search .......................... 73/313, 319, 321; 340/623, 624; 116/228

(56) References Cited

U.S. PATENT DOCUMENTS

| 50,581 A | 10/1865 | Henis |
|---|---|---|
| 558,643 A | 4/1896 | Fennessy |
| 768,109 A | 8/1904 | Ballard et al. |
| 1,825,367 A | 9/1931 | Schilling |
| 1,950,142 A | 3/1934 | Hastinge et al. |
| 2,189,991 A | 2/1940 | Muller |
| 2,550,157 A * | 4/1951 | Mazza .......................... 116/228 |
| 2,710,666 A | 6/1955 | May |
| 2,920,641 A | 1/1960 | Girolo |
| 3,283,578 A | 11/1966 | Moore |
| 3,710,613 A | 1/1973 | Innes et al. |
| 3,954,612 A * | 5/1976 | Wilkerson .................. 116/228 |
| 4,300,311 A | 11/1981 | Marchant |
| 4,384,486 A * | 5/1983 | Eckert .......................... 73/319 |
| 4,512,190 A | 4/1985 | Sledmere |
| 4,635,480 A | 1/1987 | Hrncir et al. |
| 5,020,367 A | 6/1991 | White |
| 5,027,871 A | 7/1991 | Guenther |
| 5,072,618 A | 12/1991 | Taylor et al. |
| 5,124,686 A * | 6/1992 | White et al. ................. 340/623 |
| 5,305,639 A | 4/1994 | Pontefract |
| 5,472,012 A | 12/1995 | Wood et al. |
| 5,479,820 A | 1/1996 | Fekete |
| 5,589,639 A * | 12/1996 | D'Antonio et al. ........... 73/724 |
| 5,816,224 A * | 10/1998 | Welsh et al. ................. 123/525 |
| 5,829,465 A | 11/1998 | Garretson |
| 5,874,899 A * | 2/1999 | Barmore et al. ............. 340/623 |
| 6,336,362 B1 * | 1/2002 | Duenas .......................... 73/313 |

* cited by examiner

*Primary Examiner*—Michael Cygan
(74) *Attorney, Agent, or Firm*—Fish & Richardson P.C.

(57) ABSTRACT

A tank liquid level or volume gauge for use with volatile materials, such as propane, stored under pressure as liquid and released as gas, includes a float with a float magnet that couples with a liquid level indicator magnet across a fluid impermeable wall to provide indication of tank liquid level or volume. In another embodiment, when a predetermined tank liquid level or volume is reached during filling, the float actuates an inlet closure valve to increase inlet flow resistance, creating a shutoff signal.

14 Claims, 3 Drawing Sheets

TANK VOLATILE LIQUID LEVEL OR VOLUME GAUGE

This application claims the benefit of Provisional application No. 60/256,372 filed Dec. 18, 2000.

TECHNICAL FIELD

This invention relates to tank volatile liquid level gauges, and, more particularly, to level gauges for tanks containing liquids, such as propane, that are stored under pressure, in part in liquid state and in part in gaseous state, and released in gaseous state for use.

BACKGROUND

Many a backyard cookout has been delayed or ruined when the barbecue grill propane tank has suddenly run dry due to the inability of available tank gauges to provide adequate, timely warning of low tank volume. Propane, as well other similar volatile materials, is stored, e.g., in tanks, under pressure. Typically, when the tank is full, or near full, and upright, a portion of the material contents (in the lower section of the tank) is in liquid state and a portion of the material contents (in the upper section of the tank, adjacent the outlet) is in gaseous state. The ratio of liquid-to-gas depends on a combination of: the mass of material within the tank, the tank volume, the temperature of the contents, and the pressure within the tank. As material is released from the tank in gaseous state for use, the resulting decrease in material mass and lowering of pressure within the tank causes a portion of the liquid contents to change to gaseous state and expand. As a result, the pressure within the tank remains relatively constant until all of the liquid material changes to gas. At that point, with no remaining reservoir of liquid, removal of further gas causes the pressure to drop precipitously, and the tank is soon empty. As a consequence, it has been found difficult to provide timely warning of a near-empty tank by use of a pressure gauge, in particular, for smaller portable propane tanks.

Others have proposed to address this problem by constructing barbecue grills in which the tank rests upon a crude scale or balance, with the object of providing an indication of material mass within the tank, or at least a warning when that mass decreases below a minimum level. Still others have sought to provide an indication of tank liquid level using adhesive strips containing a thermally sensitive medium, e.g., liquid crystals. The strips are applied to the outside surface of the tank at a region of desired minimum tank volume level, e.g., one-quarter tank, and seek to indicate the liquid level by sensing the location of its liquid-to-gas interface by the marked temperature difference caused by change of state from liquid to gas (with attendant consumption of calories and resulting lowering of the local temperature).

In other applications, it has been known to provide tank gauges that employ a float and coupled magnets for indication of liquid level or volume. It has also been known to provide tank closure valves actuated by a float at a predetermined liquid level or volume, e.g., as described in Ballard et al. U.S. Pat. No. 768,109 and Moore U.S. Pat. No. 3,283,578.

SUMMARY

The invention thus provides a tank liquid level or volume gauge for use with volatile materials, such as propane, which are stored in a tank in liquid form under pressure and released from the tank for use in gaseous form. The liquid level or volume gauge, operating without dynamic seals, employs a float with a float magnet that couples with a liquid level indication magnet across a fluid impermeable wall to indicate the tank liquid level or volume. The gauge may also include a dial or other device that converts the indication of liquid level into an indication of liquid volume.

In another embodiment, the invention provides a tank liquid level or volume gauge as described above that also signals to a delivery pump to shut off flow when the tank contains a predetermined volume of fluid. In particular, when the liquid in the tank reaches a predetermined level, the float actuates an inlet closure valve to increase inlet flow resistance, creating a shutoff signal.

In one aspect, the invention features a tank liquid level or volume gauge for use with a tank defining a volume containing volatile materials that are stored as a liquid under pressure and released from the tank for use in gaseous form, including: (a) a float member extending into the tank, the float member defining a float chamber configured to allow the float member to float in the liquid; (b) a float magnet joined to an upper portion of the float member; (c) an elongated shaft positioned at an upper end of the tank, the upper portion of the float member being telescopically engaged with the elongated shaft; (d) a fluid impermeable, non-magnetic wall disposed between the upper portion of the float member and the elongated shaft; and (e) a liquid level indication magnet positioned to couple with the float magnet across the fluid impermeable wall for axial positioning of the shaft in response to axial positioning of the float member, the shaft member being configured to indicate the tank liquid level by its axial positioning.

Some implementations include one or more of the following features. The liquid level or volume gauge further includes a tank upon which the gauge is mounted. The gauge further includes a coupling converting generally axial movement of the float member into lateral or rotational movement. The gauge further includes a shut-off device signaling to a delivery pump to shut off flow when the tank contains a predetermined volume of fluid. When the liquid in the tank reaches a predetermined level, a shutoff signal is created by the float member actuating an inlet closure valve to increase inlet flow resistance. The gauge further includes a cover for the tank, the cover having an indicator region through which an upper portion of the shaft is visible to a user of the tank. The upper portion of the shaft carries an indicator scale configured to provide a visual indication of the liquid level. The indicator scale includes a member having indicator panels of different colors, the colors being arranged to be displayed sequentially through the indicator region of the cover. The indicator region includes a window. The window is lens or dome-shaped. The indicator panels are green, yellow and red, to indicate, respectively, that the tank contains an adequate level of liquid, that the level of liquid has reached a low level, and that the tank is almost empty. The gauge is configured so that the green indicator panel indicates that there is sufficient liquid for at least 6 hours of operation, the yellow indicator panel indicates that there is sufficient liquid for about 2–6 hours of operation, and the red indicator panel indicates that there is sufficient liquid for 2 hours of operation or less. The volatile material is propane. The float member includes an elongated tube that extends sufficiently far into the tank so as to float when the liquid has reached a relatively low level.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
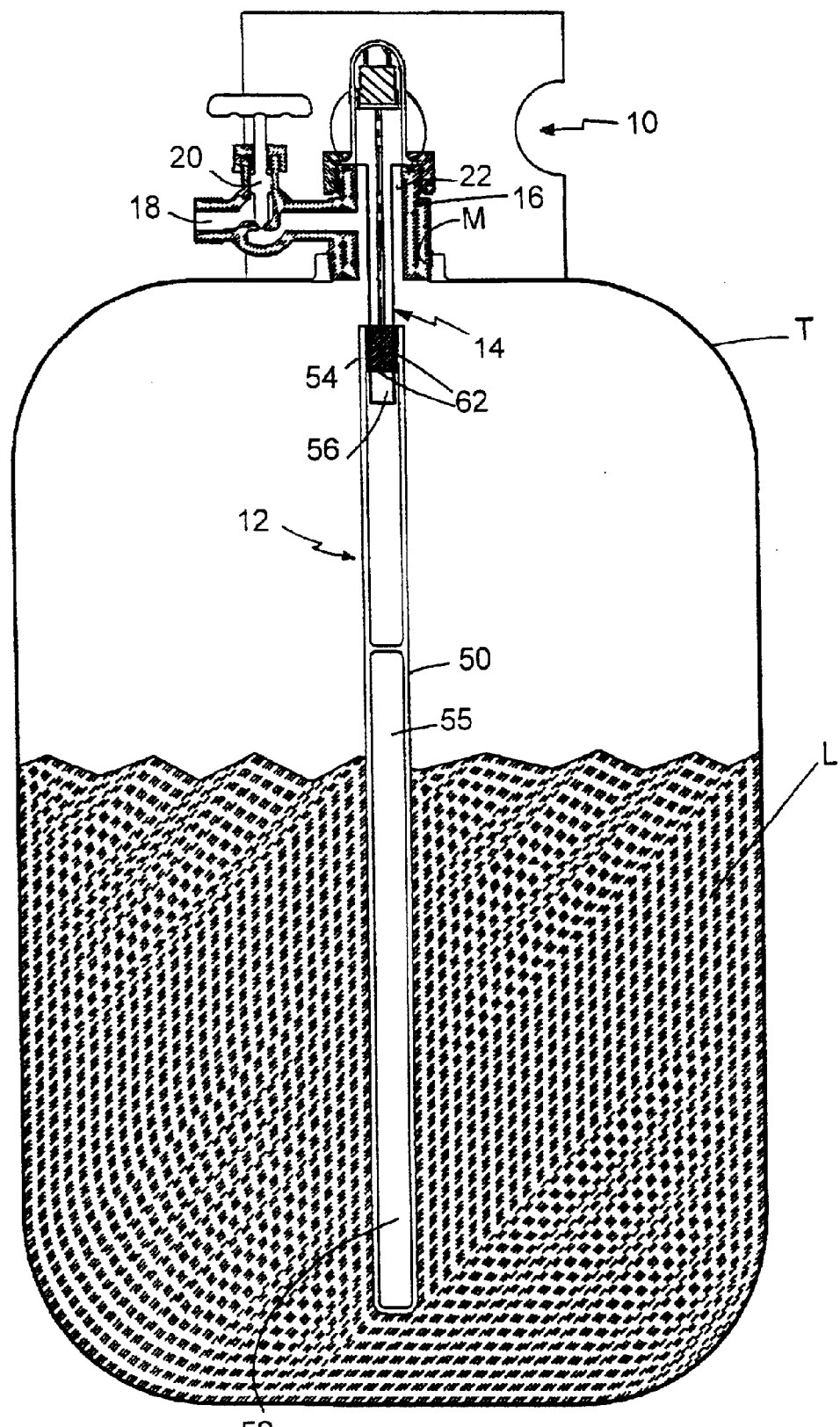
FIG. 1 is a somewhat diagrammatic side section view of a tank, e.g. a propane tank, equipped with a tank liquid level or volume gauge of the invention.
Figure 2:
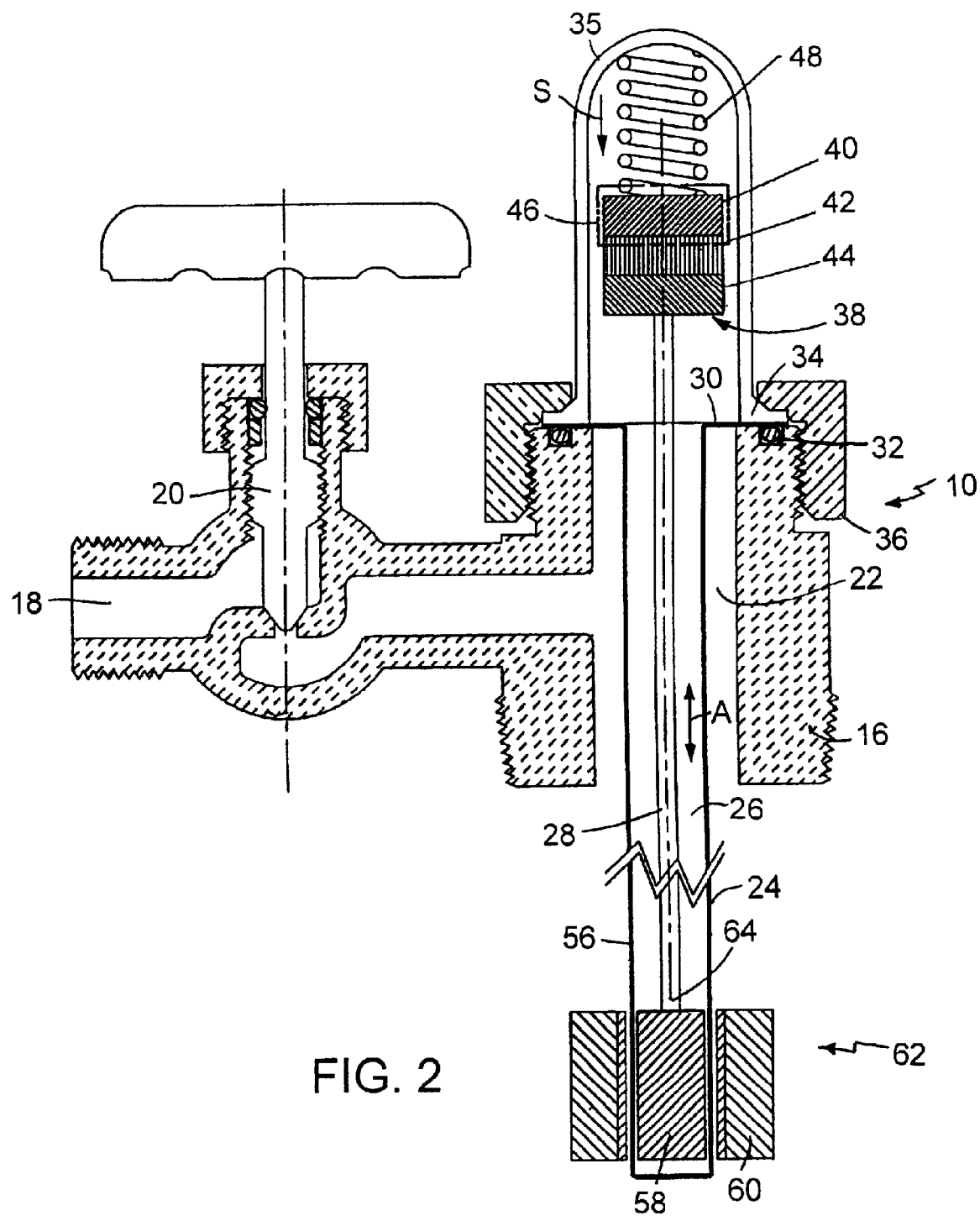
FIG. 2 is an enlarged side section view of the tank liquid level or volume gauge of FIG. 1.

Referring to FIGS. 1 and 2, the tank liquid level or volume indicator 10, consisting of a liquid level detector assembly 12 and a liquid volume indicator assembly 14, is mounted to a valve body 16 constructed for threaded engagement with the mouth, M, of a tank, T. The valve body defines a first passageway 18 with an outlet, e.g., for connecting the tank, T, to an outdoor barbecue grill, controlled by a valve 20, and a second passageway 22 for receiving the indicator 10.

The indicator assembly 14 (FIG. 2) consists of an elongated, cylindrical indicator body 24 defining a deep drawn well 26, with an indicator shaft 28 mounted for axial movement (arrow, A) therewithin. The body 24 is formed of a non-magnetic material, e.g., stainless steel, and has a flange 30 secured in sealing engagement at the outlet of passageway 22, between o-ring 32 and flange 34 of cover 35, by gland nut 36. The shaft 28 has a color indicator block 38, e.g., with red, yellow and green indicator panels 40, 42, 44, respectively, displayed in turn adjacent a window 46 in cover 35. A return spring 48 applies a downwardly directed biasing force (arrow, S) upon the indicator shaft 28.

The detector assembly 12 (FIG. 1) consists of an elongated plastic float tube 50 having a closed, lower end 52, defining a flotation chamber 55, disposed to extend into the volume of liquid, L, within the tank, T. The float tube 50 extends sufficiently far into the tank so that the float tube will continue to float when the liquid has reached a relatively low level, e.g., only enough liquid for less than two hours of operation. The float tube 50 also includes an open, upper end 54 disposed in telescoping, sliding engagement about the lower end 56 of the indicator body 24. Cooperating, coaxial elements 58, 60 of a magnetic coupling 62 (FIG. 2) are mounted, respectively, at the lower end 64 of the indicator shaft 28 and at upper end 54 of the float tube 50. Upper end 54 of the float tube 50 is joined to the magnetic coupling element 60, so that axial movement of the float tube 50 results in axial movement of magnetic coupling element 60.

In operation, the float tube 50 moves axially in response to the changing level of liquid, e.g., propane, in tank, T, to position the outer magnetic coupling element 60 along the indicator body 24. The magnetic force of the outer coupling element 60 acts upon the inner coupling element 58 through the wall of the indicator body, to position the indicator shaft 28 appropriately.

For example, while the tank contains a predetermined minimum level or volume of liquid, e.g., sufficient for about 6 hours of operation, the shaft 28 is positioned to display the green indicator panel 44 at the window 46. When the level or volume drops below that level, into an intermediate region, e.g. sufficient for about 2–6 hours of operation, the shaft 28 is positioned to display the yellow indicator panel 42 at the window 46. When the level or volume drops to a point approaching empty, e.g. less than about 2 hours of operation, the shaft 28 is positioned to display the red indicator panel 40 at the window 46. In this manner, the operator is provided with an accurate indication of remaining liquid level or volume.

Figure 3A:
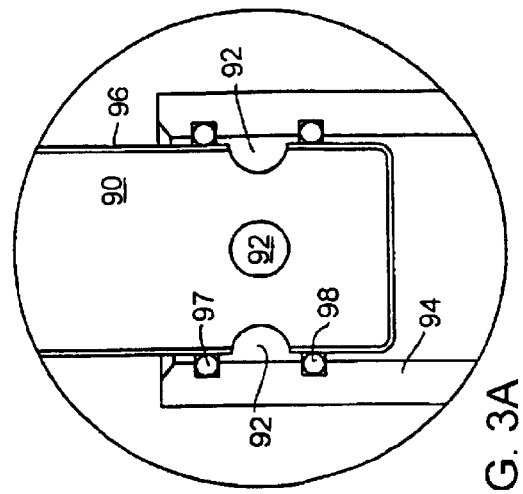
FIGS. 3A and 3B are somewhat diagrammatic side section views showing the overfill protection valve of the tank liquid level or volume gauge of FIG. 3 in closed position and in open position, respectively.
Figure 3B:
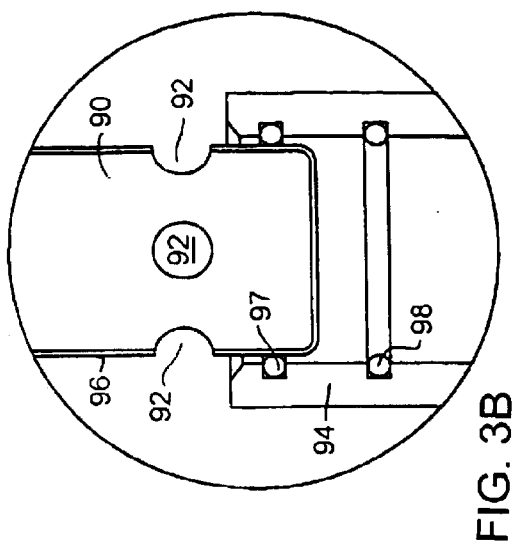
Figure 3:
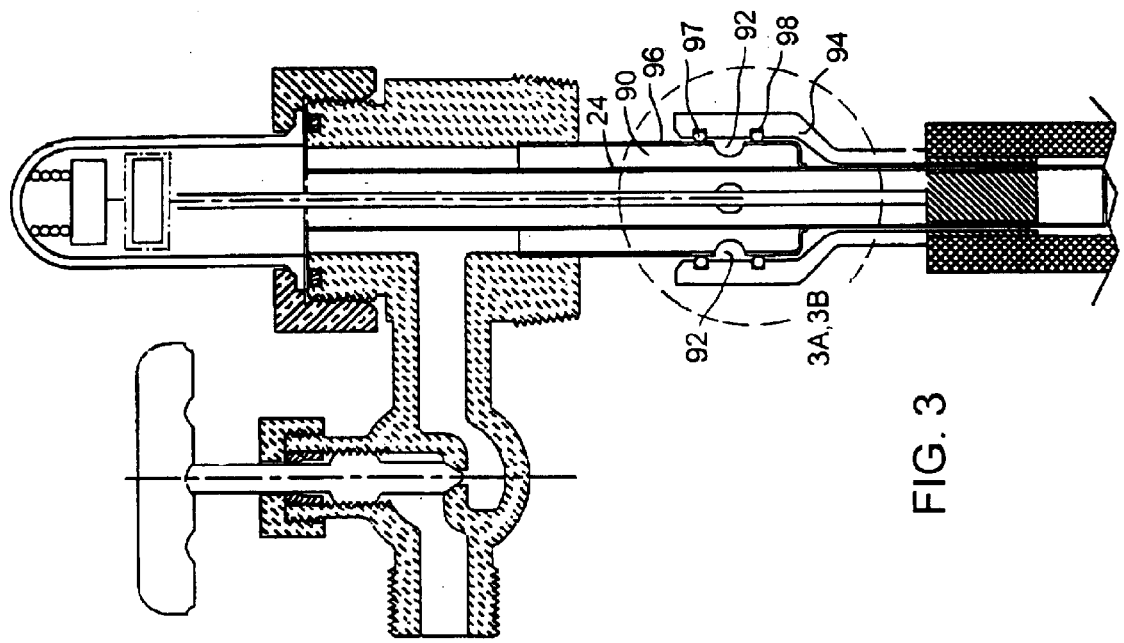
FIG. 3 is a similar enlarged side section view of another embodiment of the tank liquid level or volume gauge of the invention, i.e., with an overfill protection valve.

Referring to FIGS. 3, 3A and 3B, in another embodiment of the invention, the indicator 10 further includes a shut-off device constructed to send a signal to a delivery pump, during filling of tank T (not shown), to shut off flow of liquid into the tank when the liquid has reached a predetermined volume of liquid. This feature reduces the likelihood of the tank being overfilled.

As shown in FIG. 3, liquid propane or the like is delivered into the tank through a passageway 90 to outlets 92 defined in a sleeve 96 disposed about the indicator body 24 (not shown in FIGS. 3A and 3B). During the filling operation, a valve closure element 94 is initially in the position shown in FIG. 3B, allowing liquid to enter the tank T through outlets 92. The valve closure element 94 is mounted to the float tube 50, discussed above, for axial movement along the body 24. As the liquid in the tank reaches a predetermined level or volume, the valve closure element 94 engages over the outlets 92, with o-rings 97, 98 being disposed about the body to resist further flow into the tank (FIG. 3A). Thus, by increasing flow resistance in this manner, pressure is increased, signaling the delivery pump to discontinue flow.

A number of embodiments of the invention have been described. Nevertheless, it will be understood that various modifications may be made without departing from the spirit and scope of the invention. For example, window 46 may have the form of a lens or dome to enhance visibility of the indicator panel or other display of tank liquid level or volume. The liquid volume indicator assembly may also include a coupling for converting generally vertical movement of the float into lateral or rotational movement for display of liquid level or volume on a dial or gauge and the like, e.g., as described in Ballard et al. U.S. Pat. No. 768,109, the complete disclosure of which is incorporated herein by reference. Accordingly, other embodiments are within the scope of the following claims.

What is claimed is:

1. A tank liquid level or volume gauge for use with a tank defining a volume containing volatile materials that are stored as a liquid under pressure and released from the tank for use in gaseous form, comprising:

a float member extending into the tank, the float member defining a float chamber configured to allow the float member to float in the liquid;

a float magnet joined to the upper portion of the float member;

a substantially linear rigid shaft positioned at an upper end of the tank, the upper portion of the float member being coaxially engaged with the shaft;

a fluid impermeable, non-magnetic wall disposed between the upper portion of the float member and the shaft; and a liquid level indication magnet positioned to couple with the float magnet across the fluid impermeable wall for axial positioning of the shaft corresponding to axial positioning of the float member;

the shaft being configured to transmit an axial force to a biasing member to indicate the tank liquid level by its axial positioning.

2. The tank liquid level or volume gauge of claim 1 and further comprising a tank upon which said gauge is mounted.

3. The tank liquid level or volume gauge of claim 1 or claim 2, further including a coupling converting generally axial movement of the float member into lateral or rotational movement.

4. The tank liquid level or volume gauge of claim 1 or claim 2, further including a shut-off device signaling to a delivery pump to shut off flow when the tank contains a predetermined volume of fluid.

5. The tank liquid level or volume gauge of claim 4 wherein, when the liquid in the tank reaches a predetermined level, a shutoff signal is created by the float member actuating an inlet closure valve to increase inlet flow resistance.

6. The tank liquid level or volume gauge of claim 1 or claim 2 further comprising a cover for the tank, the cover having an indicator region through which an upper portion of the shaft is visible to a user of the tank.

7. The tank liquid level or volume gauge of claim 6 wherein the upper portion of the shaft carries an indicator scale configured to provide a visual indication of the liquid level.

8. The tank liquid level or volume gauge of claim 7 wherein the indicator scale comprises a member having indicator panels of different colors, the colors being arranged to be displayed sequentially through the indicator region of the cover.

9. The tank liquid level or volume gauge of claim 6 wherein the indicator region comprises a window.

10. The tank liquid level or volume gauge of claim 6 wherein the window is lens or dome-shaped.

11. The tank liquid level or volume gauge of claim 8 wherein the indicator panels are green, yellow and red, to indicate, respectively, that the tank contains an adequate level of liquid, that the level of liquid has reached a low level, and that the tank is almost empty.

12. The tank liquid level or volume gauge of claim 11 wherein the gauge is configured so that the green indicator panel indicates that there is sufficient liquid for at least 6 hours of operation, the yellow indicator panel indicates that there is sufficient liquid for about 2–6 hours of operation, and the red indicator panel indicates that there is sufficient liquid for 2 hours of operation or less.

13. The tank liquid level or volume gauge of claim 1 or claim 2 wherein the volatile material is propane.

14. The tank liquid level or volume gauge of claim 1 or claim 2 wherein the float member comprises an elongated tube that extends sufficiently far into the tank so as to float when the liquid has reached a relatively low level.

* * * * *